(12) United States Patent
Kim et al.

(10) Patent No.: US 9,065,111 B2
(45) Date of Patent: Jun. 23, 2015

(54) BATTERY PACK

(75) Inventors: Myeongcheol Kim, Yongin-si (KR); Taeyong Kim, Yongin-si (KR); Hyunye Lee, Yongin-si (KR); Kangsik Jung, Yongin-si (KR); Shidong Park, Yongin-si (KR)

(73) Assignees: Samsung SDI Co., Ltd., Yongin-si (DE); Robert Bosch GmbH, Stuttgart (DE)

( * ) Notice: Subject to any disclaimer, the term of this patent is extended or adjusted under 35 U.S.C. 154(b) by 1099 days.

(21) Appl. No.: 12/874,176

(22) Filed: Sep. 1, 2010

(65) Prior Publication Data
US 2011/0294000 A1 Dec. 1, 2011

Related U.S. Application Data

(60) Provisional application No. 61/348,646, filed on May 26, 2010.

(51) Int. Cl.
*H01M 2/04* (2006.01)
*H01M 2/10* (2006.01)

(52) U.S. Cl.
CPC .................... *H01M 2/1077* (2013.01)

(58) Field of Classification Search
CPC .................................. H01M 2/1077
USPC ............................... 429/176, 177
See application file for complete search history.

(56) References Cited

U.S. PATENT DOCUMENTS

| | | | |
|---|---|---|---|
| 3,167,458 A | 1/1965 | Brazell | |
| 4,020,244 A | 4/1977 | Selinko | |
| 5,536,595 A * | 7/1996 | Inkmann et al. | 429/120 |
| 5,709,280 A | 1/1998 | Beckley et al. | |
| 6,482,542 B1 * | 11/2002 | Takaki et al. | 429/120 |
| 6,586,132 B1 * | 7/2003 | Fukuda et al. | 429/120 |
| 6,761,992 B1 | 7/2004 | Murakawa et al. | |
| 7,989,105 B2 * | 8/2011 | Suzuki et al. | 429/185 |
| 2003/0027042 A1 * | 2/2003 | Huang | 429/176 |
| 2003/0059676 A1 * | 3/2003 | Ruiz Rodriguez et al. | 429/164 |
| 2007/0099077 A1 * | 5/2007 | Aamodt et al. | 429/167 |
| 2007/0287063 A1 * | 12/2007 | Hiratsuka et al. | 429/177 |

(Continued)

FOREIGN PATENT DOCUMENTS

| | | |
|---|---|---|
| CN | 1290046 A | 4/2001 |
| CN | 101606251 A | 12/2009 |

(Continued)

OTHER PUBLICATIONS

Japanese Office action dated Feb. 5, 2013, for corresponding Japanese Patent application 2011-069928, (1 page).

(Continued)

*Primary Examiner* — Nicholas P D'Aniello
(74) *Attorney, Agent, or Firm* — Christie, Parker & Hale, LLP

(57) ABSTRACT

An embodiment of the invention relates to a battery pack having a strength-reinforced housing that accommodates a plurality of battery cells. In one embodiment, the battery pack includes one or more battery cells, a housing accommodating the one or more battery cells, and a reinforcement portion formed in the housing. The housing has a bottom portion and three sidewalls upwardly extending from three-sided perimeters of the bottom portion. The reinforcement portion surrounds surfaces of the three sidewalls.

18 Claims, 10 Drawing Sheets

(56) References Cited

U.S. PATENT DOCUMENTS

| | | |
|---|---|---|
| 2008/0054849 A1* | 3/2008 | Kim .............................. 320/136 |
| 2008/0057393 A1 | 3/2008 | Onuki et al. |
| 2009/0220848 A1* | 9/2009 | Yang et al. ..................... 429/34 |
| 2010/0000816 A1* | 1/2010 | Okada .......................... 180/68.5 |
| 2010/0112424 A1 | 5/2010 | Hayashi |
| 2010/0247996 A1* | 9/2010 | Ijaz et al. ..................... 429/120 |
| 2010/0266878 A1* | 10/2010 | Eilertsen ........................ 429/53 |
| 2010/0273046 A1* | 10/2010 | Kuo et al. .................... 429/175 |
| 2011/0064992 A1 | 3/2011 | Kim et al. |

FOREIGN PATENT DOCUMENTS

| | | |
|---|---|---|
| DE | 42 26 428 A1 | 2/1994 |
| EP | 1 089 373 A1 | 4/2001 |
| JP | 2001-236937 | 8/2001 |
| JP | 2002-100327 A | 4/2002 |
| JP | 2006-244755 | 9/2006 |
| JP | 2006-286357 | 10/2006 |
| JP | 2008-192447 | 8/2008 |
| JP | 2008-192551 A | 8/2008 |
| KR | 10-2007-0025738 A | 3/2007 |
| KR | 10-2008-0022485 | 3/2008 |
| KR | 10-2010-0005666 | 1/2010 |

OTHER PUBLICATIONS

Patent Abstracts of Japan, and English machine translation of Japanese Publication 2006-244755 listed above, (17 pages).
Patent Abstracts of Japan, and English machine translation of Japanese Publication 2006-286357 listed above, (16 pages).
Patent Abstracts of Japan, and English machine translation of Japanese Publication 2008-192447 listed above, (12 pages).
Extended European Search Report dated Dec. 6, 2010 in corresponding European application No. EP 10176096.5.
English machine translation for Japanese Publication No. JP 2001-236937 published Aug. 31, 2007 in the name of Eto.
SIPO Office action dated Jun. 24, 2013, with English translation, for corresponding Chinese Patent application 201110043729.3, (24 pages).

* cited by examiner

BATTERY PACK

CROSS-REFERENCE TO RELATED APPLICATIONS

This application claims the benefit of U.S. Provisional Application No. 61/348,646, filed on May 26, 2010, in the United States Patent and Trademark Office, the disclosure of which is incorporated herein in its entirety by reference.

TECHNICAL FIELD

An embodiment of the present invention relates to a battery pack.

BACKGROUND ART

In general, a medium-sized battery pack including a plurality of battery cells is primarily used as a power source of an electric bicycle or an electric motorcycle. The battery pack includes a plurality of rechargeable battery cells, a housing for accommodating the plurality of rechargeable battery cells, and a battery monitoring system (BMS) board for monitoring the plurality of rechargeable battery cells.

The battery cells are typically lithium ion batteries, lithium polymer batteries, or lithium ion polymer batteries, and the housing may be made of a plastic-injected material. In addition, the BMS board is electrically connected to the battery cells to control charge and discharge of the battery cells and to calculate the capacities of the battery cells. Further, the BMS board includes a connector to be electrically connected to an external device (e.g., a charger or a load).

SUMMARY

An embodiment of the present invention provides a battery pack having a strength-reinforced housing that accommodates a plurality of battery cells.

In one embodiment, a battery pack includes a battery module comprising at least one battery cell; a housing accommodating the at least one battery cell, the housing comprising a bottom plate and a plurality of side walls extending from the bottom plate; and a reinforcement member coupled to the housing, wherein the reinforcement member is at three sides of the housing.

In one embodiment, the side walls each have a plurality of ribs extending therefrom in a direction generally away from the at least one battery cell and wherein the reinforcing member contacts the ribs. The reinforcing member may have a coupling portion configured to receive a fastener to couple the reinforcing member to the housing. A first side wall and a second side wall may extend in a direction substantially parallel to each other and the housing may have an attachment flange extending from the first and second side walls and may be configured to abut the coupling portion.

In one embodiment, a fastener, such as a bolt, extends through an opening in the coupling portion and an opening in the attachment flange to couple the reinforcing member and the housing together. The housing may be made from a resin and the reinforcing member may be made from an engineering plastic resin, a fiber-reinforced plastic resin or a metal.

In one embodiment, an end plate is coupled to the reinforcing member. Further, the housing may have a coupling portion and an outer cover coupled to the housing by the coupling portion. Additionally, the reinforcing member can be a single integral unit and can extend around the three sides of the battery module. More specifically, the reinforcing member may have a pair of substantially parallel side members, a rear wall, and a pair of connection portions, one of the connection portions between the rear wall and a respective one the side members. Additionally, at least one of the pair of connection portions may be curved.

Further, the housing may also include a plurality of flanges, which may be rectangular, adapted to engage openings of the reinforcing member to couple the reinforcing member to the housing. Additionally, in one embodiment, a plurality of ribs extend from the bottom plate in a direction away from the battery cells.

According to one embodiment of the present invention, a battery pack strength-reinforced housing is provided by including a reinforcement portion formed of a plastic housing that accommodates a plurality of battery cells. Thus, the battery pack can be suppressed from being deformed due to external impact while safely protecting the plurality of battery cells accommodated therein against external impact.

In addition, since a plurality of holes are formed in the reinforcement portion, an increase in the weight of the battery pack can be minimized.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1A:
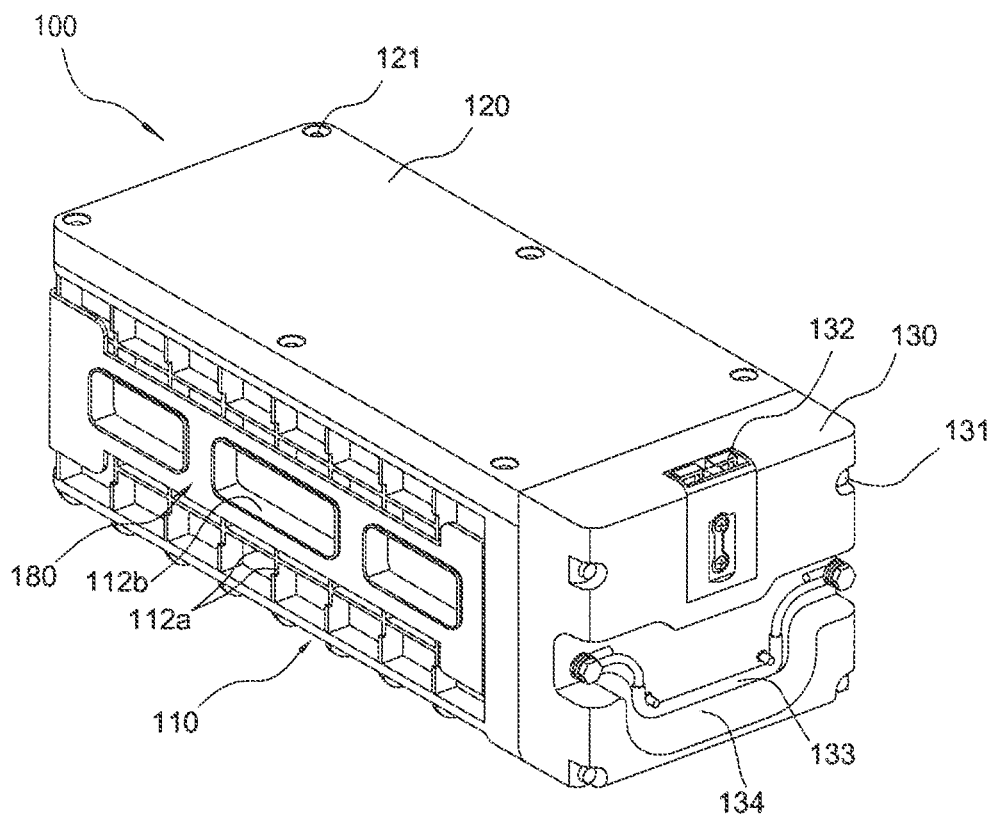
FIG. 1A is a perspective view of a battery pack according to an embodiment of the present invention.
Figure 1B:
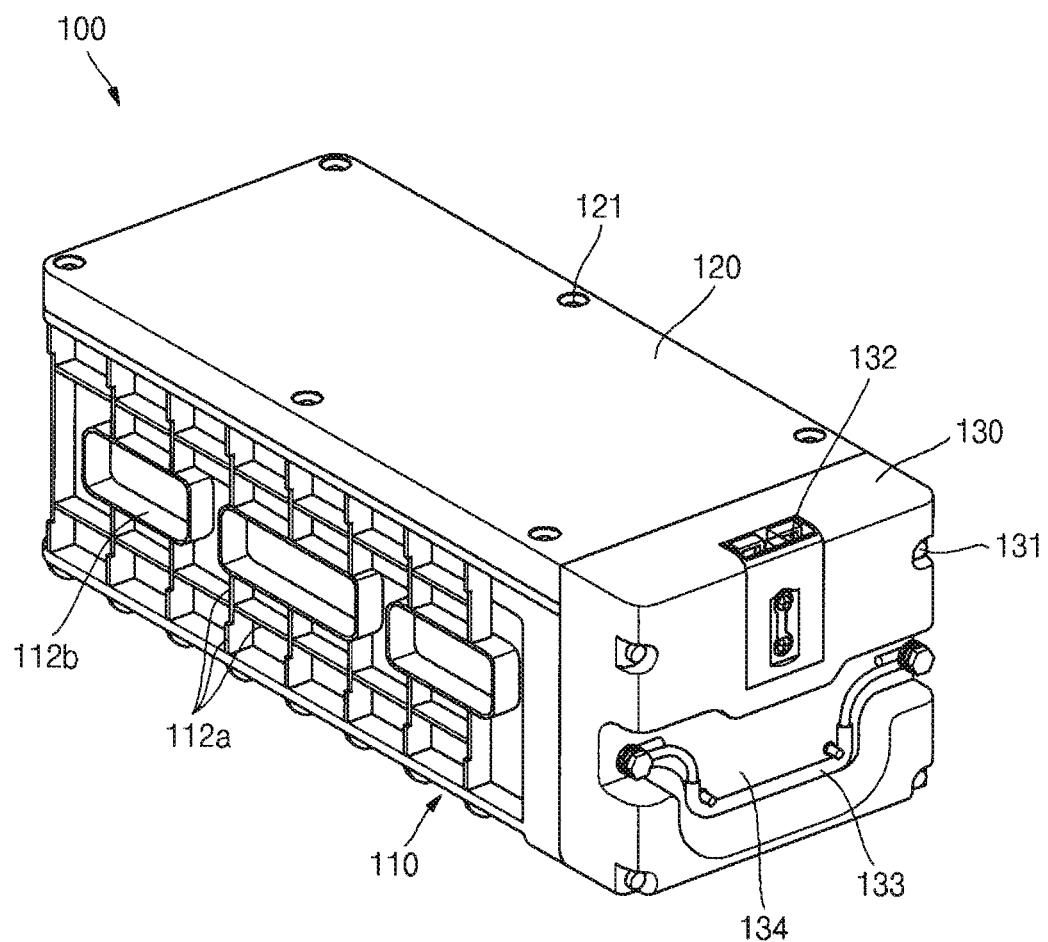
FIG. 1B is perspective view illustrating a state in which a reinforcement portion are absent from the battery pack shown in FIG. 1A.

FIG. 1A is a perspective view of a battery pack according to an embodiment of the present invention, and FIG. 1B is perspective view illustrating a state in which a reinforcement portion are absent from the battery pack shown in FIG. 1A.

As shown in FIGS. 1A and 1B, the battery pack 100 may include a housing 110 accommodating a plurality of battery cells therein, an upper cover 120 covering an upper portion of the housing 110, a front cover 130 covering a front portion of the housing 110, and a reinforcement portion 180 coupled to a side surface of the housing 110.

In order to increase the strength of the housing 110, a plurality of latticed ribs 112a protruding outwardly from the surface of the housing 110 and a plurality of elliptical ribs 112b may be formed on the surface of the housing 110. In addition, the upper cover 120 may be coupled to the housing 110 by the plurality of bolts 121, and the front cover 130 may also be coupled to the housing 110 by the plurality of bolts 131. Further, the front cover 130 may include a connector 132 electrically connected to an external device (e.g., a charger or a load). Moreover, a handle 133 may be combined with the front cover 130 to provide enhanced portability of the battery pack 100. Alternatively, a handle groove 134 for accommodating the handle 133 may also be formed in the front cover 130.

Here, the housing 110 may be formed by injection molding using plastic resin in a mold. The plastic resin may be at least one selected from the group consisting of Acrylonitrile-Butadience-Stryene (ABS), Polyamide (PA), PolyCarbonate (PC), PolyChloroTriFluoroethylene (PCTFE), Poly DiAllyl Phthalate (PDAP), Poly Ethylene (PE), Poly Ethylene TerePhthalate (PETP), Phenol-Formaldehyde (PF), Polyisobutylene (PIB), Poly Methyl MethAcrylate (PMMA), Polyoxymethylene (POM); Polyformaldehyde (PF), PolyPropylene (PP), PolyStyrene (PS), PolyTetraFluoroEthylene (PTFE), Polyurethane (PUR), Poly Vinyl Acetate (PVAC), Poly Vinyl Alcohol (PVA), Poly Vinyl Butyral (PVB), Poly Vinyl Chloride (PVC), Poly Vinyl Chloride Acetate (PVCA), Poly VinyliDene Chloride (PVDC), Poly Vinyl Fluoride (PVF), Poly Vinyl ForMal (PVFM), and equivalents thereof, but the material of the housing 110 is not limited to the materials listed.

Figure 2:
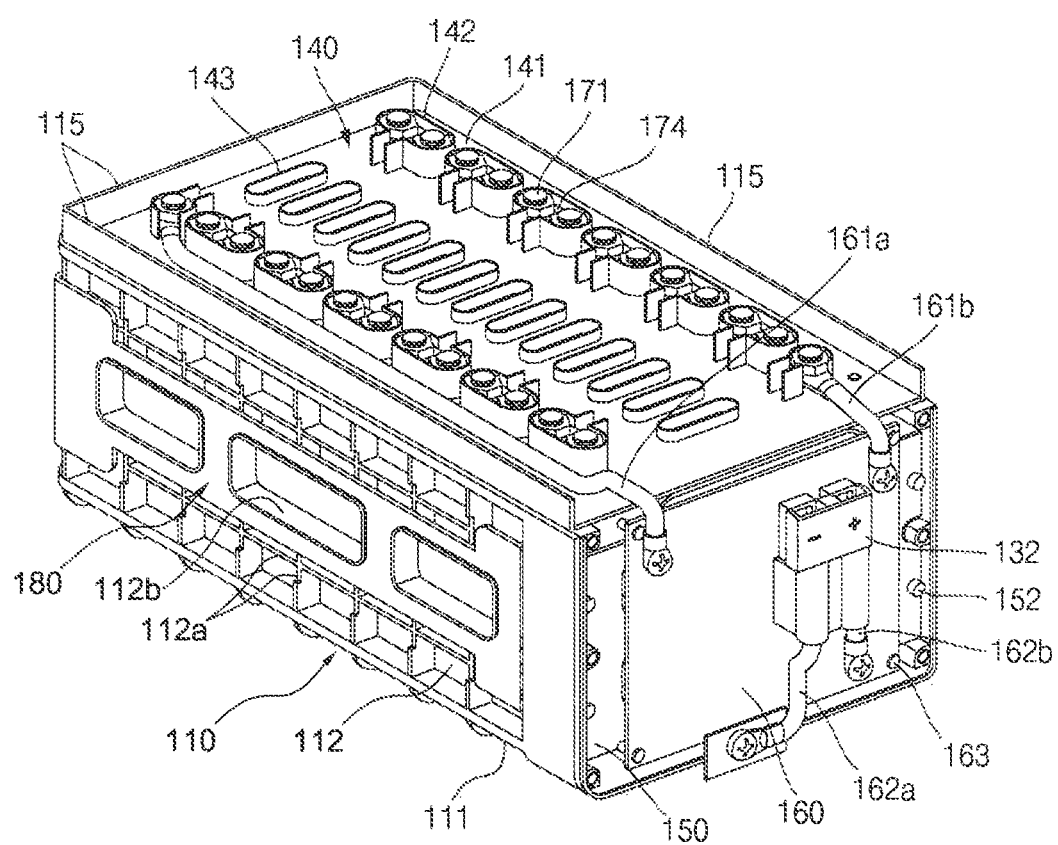
FIG. 2 is a perspective view illustrating a state in which an upper cover and a front cover are absent from the battery pack shown in FIG. 1A.

FIG. 2 is a perspective view illustrating a state in which an upper cover and a front cover are removed from the battery pack shown in FIG. 1A.

As shown in FIG. 2, in the battery pack according to an embodiment of the present invention, the housing 110 includes a bottom plate or bottom portion 111, and three sidewalls 112 connected to the bottom portion 111.

Here, the three sidewalls 112 upwardly extend from three edges of the bottom portion 111. Therefore, the plurality of battery cells can be accommodated in an inner space formed by the bottom portion 111 and the three sidewalls 112. In addition, the housing 110 is configured such that its front and upper portions are open.

An upper coupling portion 115 coupled to the upper cover 120 protrudes from top ends of the three sidewalls 112. In addition, the middle cover 140 is positioned on a top surface of the housing 110, that is, at the interior of the upper coupling portion 115. The plurality of battery cells are positioned in the inner space formed by the middle cover 140 and the housing 110. The middle cover 140 includes a substantially plate-shaped body 141, a bus bar seating portion 142 formed on the body 141 to allow a plurality of bus bars 174 to be seated thereon, and a plurality of gas release guides 143 formed at locations generally corresponding to safety vents of the battery cells on the body 141. Here, the bus bars 174 electrically connect terminals 171 of adjacent battery cells to each other. In addition, first ends of power lines 161a and 161b are connected to particular bus bars 174 among the plurality of bus bars 174.

Meanwhile, an end plate 150 and a BMS board 160 are located on the housing 110. Second ends of the power lines 161a and 161b are connected to the BMS board 160. Further, the connector 132 is mechanically coupled to the BMS board 160 and electrically connected to the BMS board 160 by other power lines 162a and 162b. In addition, a plurality of electronic components for controlling charge/discharge and calculating capacities of battery cells are mounted on the BMS board 160. The BMS board 160 is coupled to the housing 110 by a plurality of bolts 163.

Figure 3:
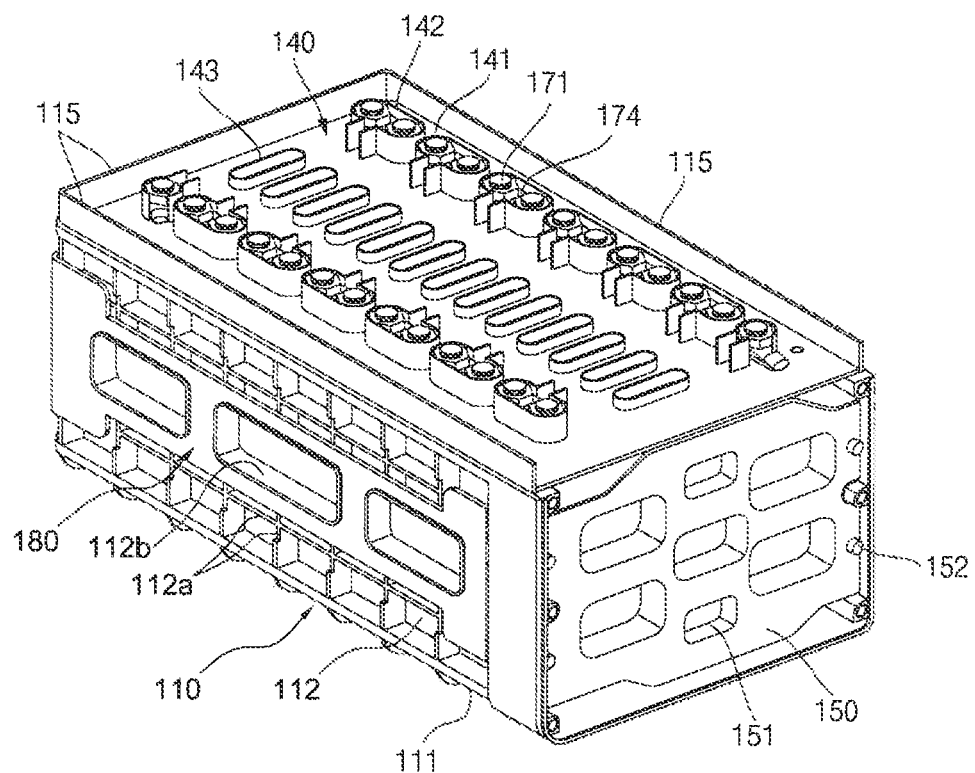
FIG. 3 is a perspective view illustrating a state in which a BMS board and a connector are absent from the battery pack shown in FIG. 1A.

FIG. 3 is a perspective view illustrating a state in which a BMS board and a connector are removed from the battery pack shown in FIG. 1A.

As shown in FIG. 3, the end plate 150 is connected to the front of the housing 110. The end plate 150 serves to securely contact the plurality of battery cells with the sidewalls 112 of the housing 110. In particular, the end plate 150 allows the plurality of battery cells to securely contact the sidewalls 112 of the housing 110 facing the end plate 150.

In addition, the end plate 150 includes a plurality of holes 151 for reducing the overall weight of the end plate 150. The end plate 150 is coupled to the housing 110 by a plurality of bolts 152.

Further, the plurality of bolts 152 perforate the end plate 150 and the housing 110 to be engaged with the reinforcement portions 180 by means of nuts. The plurality of bolts 152 serve to closely contact the reinforcement portions 180 with the three sidewalls 112 provided in the housing 110. The reinforcement portions 180 and a connection relationship between the reinforcement portions 180 and the housing 110 will be described below in further detail.

Figure 4:
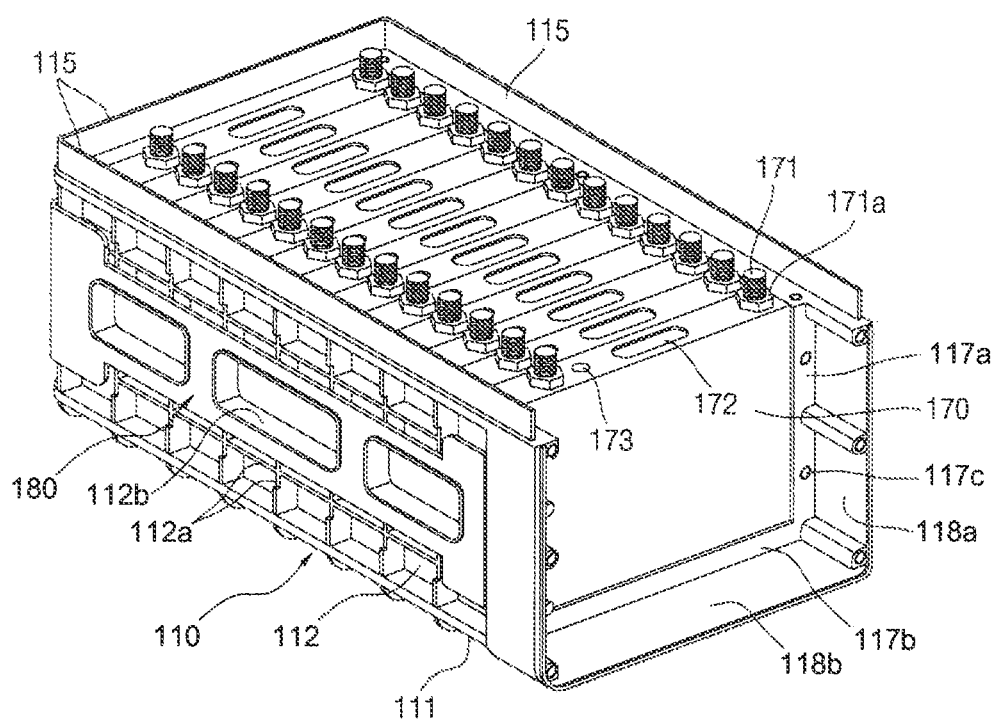
FIG. 4 is a perspective view illustrating a state in which a middle cover and an end plate are absent from the battery pack shown in FIG. 1A.

FIG. 4 is a perspective view illustrating a state in which a middle cover and an end plate are removed from the battery pack shown in FIG. 1A.

As shown in FIG. 4, the plurality of battery cells 170 are accommodated in an inner space formed by the bottom portion 111 and sidewalls 112 of the housing 110 such that the plurality of battery cells 170 are stacked in a horizontal direction (as shown in the figure). Each of the plurality of battery cells 170 has one or more terminals 171 formed on its top surface. In addition, each of the plurality of battery cells 170 has a relatively thin safety vent 172 and a plug 173 closing an electrolyte injection hole formed on the top surface.

The bottom surface of the battery cell 170 is closely adhered to the bottom portion 111 of the housing 110. In addition, two narrow side surfaces of the battery cell 170 are closely adhered to the sidewalls 112 of the housing 110 facing each other. Further, the wide surface of the hindmost battery cell 170 of the plurality of battery cells 170 is closely adhered to the rear sidewall 112.

In one embodiment, the housing 110 further includes a pair of front vertical extending portions 117a configured to fix the end plate 150 and the reinforcement portion 180 together. The front vertical extending portions 117a are provided for mounting the end plate and a BMS board, and may further include front horizontal extending portions or flanges 118a coupled to a front cover.

In one embodiment, the front vertical extending portions 117a are regions outwardly extending from the sidewalls 112 and have a plurality of holes 117c for bolt engagement.

In FIG. 4, the battery pack 100 includes another front vertical extending portion 117b that connects the two front vertical extending portions 117a and outwardly extends from the bottom portion 111 and another front horizontal extending portion 118b that connects the two horizontal extending portions 118a and outwardly extends from the front vertical extending portion 117b.

Figure 5:
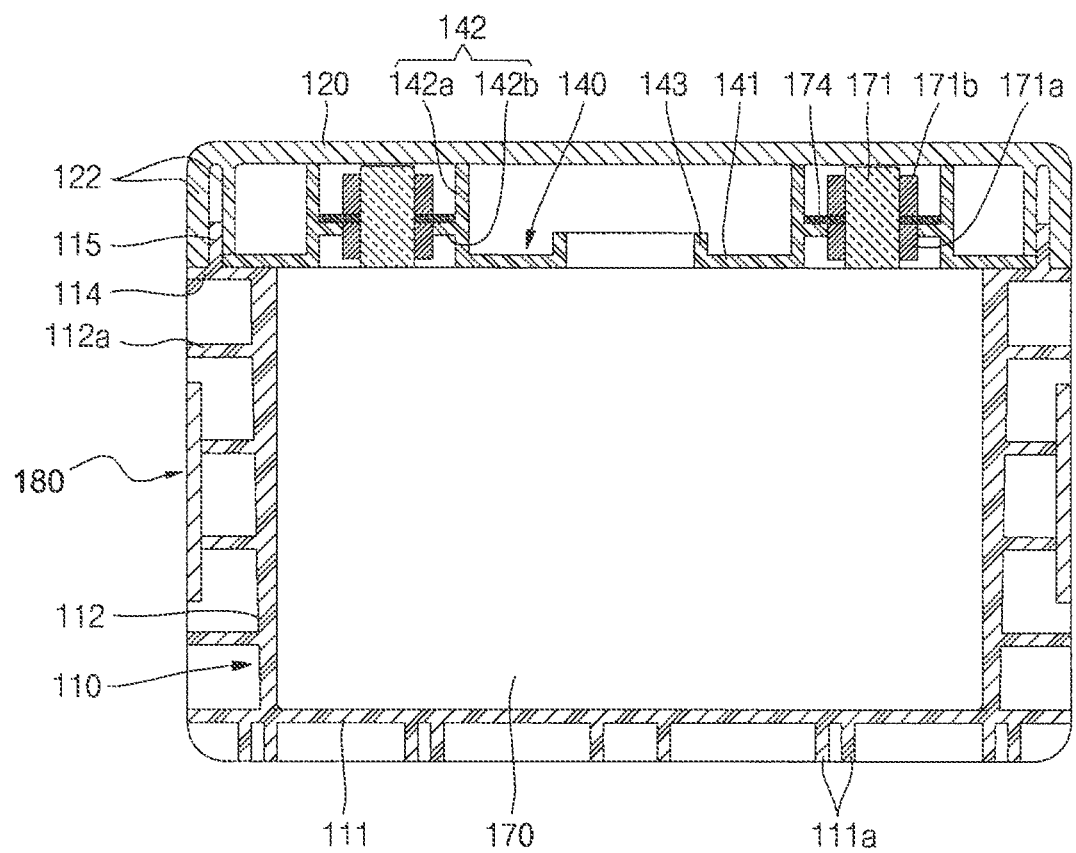
FIG. 5 is a longitudinal section view of FIG. 1A.

FIG. 5 is a longitudinal section view of FIG. 1A. As shown in FIG. 5, the housing 110 includes a bottom portion 111 and sidewalls 112 extending from the perimeter of the bottom portion 111.

For the purpose of increasing the strength of the housing 110, a plurality of latticed ribs 112a are formed on the sidewalls 112 and a plurality of latticed ribs 111a are formed on the outer surface of the bottom portion 111. In addition, upper extending portions 114 outwardly extending in a horizontal direction (i.e., substantially parallel to the ribs 112a) are further formed at upper ends of the sidewalls 112, and each of the upper extending portions 114 includes an upper coupling portion 115 upwardly protruding and coupled to the upper cover 120.

As described above, the plurality of battery cells 170 are accommodated in an internal space formed by the bottom portion 111 and the sidewalls 112 of the housing 110. In addition, as described above, each of the plurality of battery cells 170 has one or more terminals 171 upwardly protruding, and a bus bar 174 is coupled to each of the one or more terminals 171.

The middle cover 140 is positioned on the top surface of the housing 110 and the plurality of battery cells 170. In other words, the middle cover 140 substantially covering the plurality of battery cells 170 is coupled between the housing 110 and the upper cover 120.

The middle cover 140 includes a plate-shaped body 141. The plate-shaped body 141 is seated on the upper extending portions 114 of the housing 110 and the top surface of the battery cells 170. In addition, the middle cover 140 includes a bus bar seating portion 142 having an internal hollow at an area generally corresponding to a terminal 171 of each of the battery cells 170. The bus bar seating portion 142 includes an upper protrusion 142a and an internal middle protrusion 142b. A lower nut 171a coupled to the terminal 171 is positioned below the internal middle protrusion 142b, and a bus bar 174 coupled to the terminal 171 and an upper nut 171b are positioned above the internal middle protrusion 142b. Thus, the middle cover 140 may be fixed to the top surface of the housing 110 and the battery cell 170 by the bus bars 174 and the upper nut 171b. In addition, the middle cover 140 may include the plurality of gas release guides 143 having internal hollows, by which the internal gas can be quickly guided to the outside when the safety vent 172 is opened.

In addition, the upper cover 120 is coupled to the upper coupling portion 115 formed in the extending portion 114 of the housing 110. To this end, spaced dual coupling portions 122 downwardly extending (i.e., toward the bottom wall 111) are formed along the perimeter of the upper cover 120. In other words, the upper coupling portion 115 of the housing 110 is coupled to the spaced dual coupling portions 122 of the upper cover 120. As described above, since the spaced dual coupling portions 122 formed in the upper cover 120 are coupled to the upper coupling portion 115 of the housing 110, external moisture or foreign material may not infiltrate the battery pack 100.

Further, since the reinforcement portion 180 is seated on the plurality of latticed ribs 112a formed on the opposite sidewalls 112, the strength of the housing 110, specifically, the sidewalls 112, can be enhanced.

Figure 6:
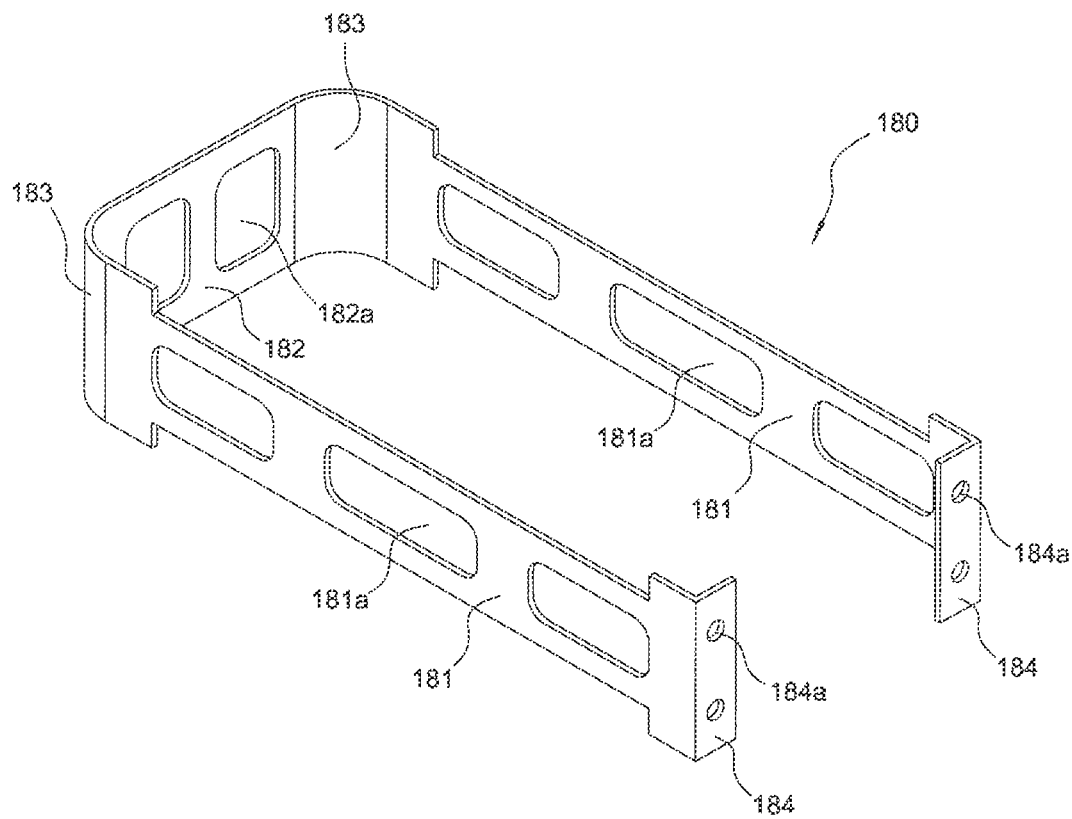
FIG. 6 is a perspective view of a reinforcement portion of the battery pack shown in FIG. 1A.

FIG. 6 is a perspective view of a reinforcement portion of the battery pack shown in FIG. 1A.

As shown in FIG. 6, the reinforcement portion 180 may include a pair of opposite sidewall reinforcement portions 181 closely contacting a pair of sidewalls forming a housing, and a rear sidewall reinforcement portion 182 closely contacting a rear sidewall forming the housing. In one embodiment, the pair of opposite sidewall reinforcement portions 181 and the rear sidewall reinforcement portion 182 are integrally formed as a single unit. In addition, the opposite sidewall reinforcement portions 181 have curved portions 183 contacting the rear sidewall reinforcement portion 182 and are configured to be curved. The opposite sidewall reinforcement portions 181 and the rear sidewall reinforcement portion 182 may have a plurality of holes 181a and 182a, respectively, for minimizing the weight of the reinforcement portion 180.

In one embodiment, coupling portions 184 closely coupled to the front vertical extending portions 117a formed in the housing 110 are formed in front of the opposite sidewall reinforcement portions 181. The coupling portions 184 are bent from the opposite sidewall reinforcement portions 181 toward substantially the interior side of the housing 110. In addition, one or more holes 184a are formed in the coupling portions 184 to allow bolts to pass therethrough, and pre-welded nuts may be provided on the rear surface of the coupling portions 184 corresponding to the one or more holes 184a.

The reinforcement portion 180 may be made of at least one metal selected from the group consisting of stainless steel, aluminum, aluminum alloy, copper, copper alloy, magnesium, magnesium alloy, and equivalents thereof. The reinforcement portion 180 may also be made of at least one selected from the group consisting of engineering plastics, fiber reinforced plastics (FRPs) and equivalents thereof. Examples of the engineering plastics may include Polyamide (PA), Polyacetal, Polycarbonate (PC), Modified Polyphenylen Oxide (MPPO), PolyButylene Terephthalate (PBT), and equivalents thereof. The FRPs may be formed by mixing the engineering plastics with glass fibers or carbon fibers.

Figure 7A:
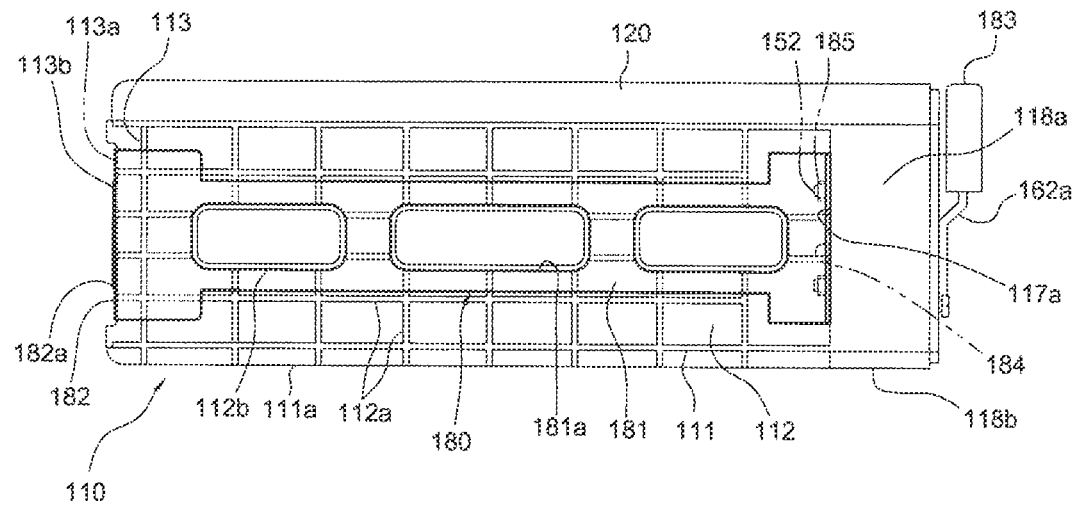
FIGS. 7A and 7B are a side view and a front view illustrating a state in which the front cover is absent from the battery pack shown in FIG. 1A.
Figure 7B:
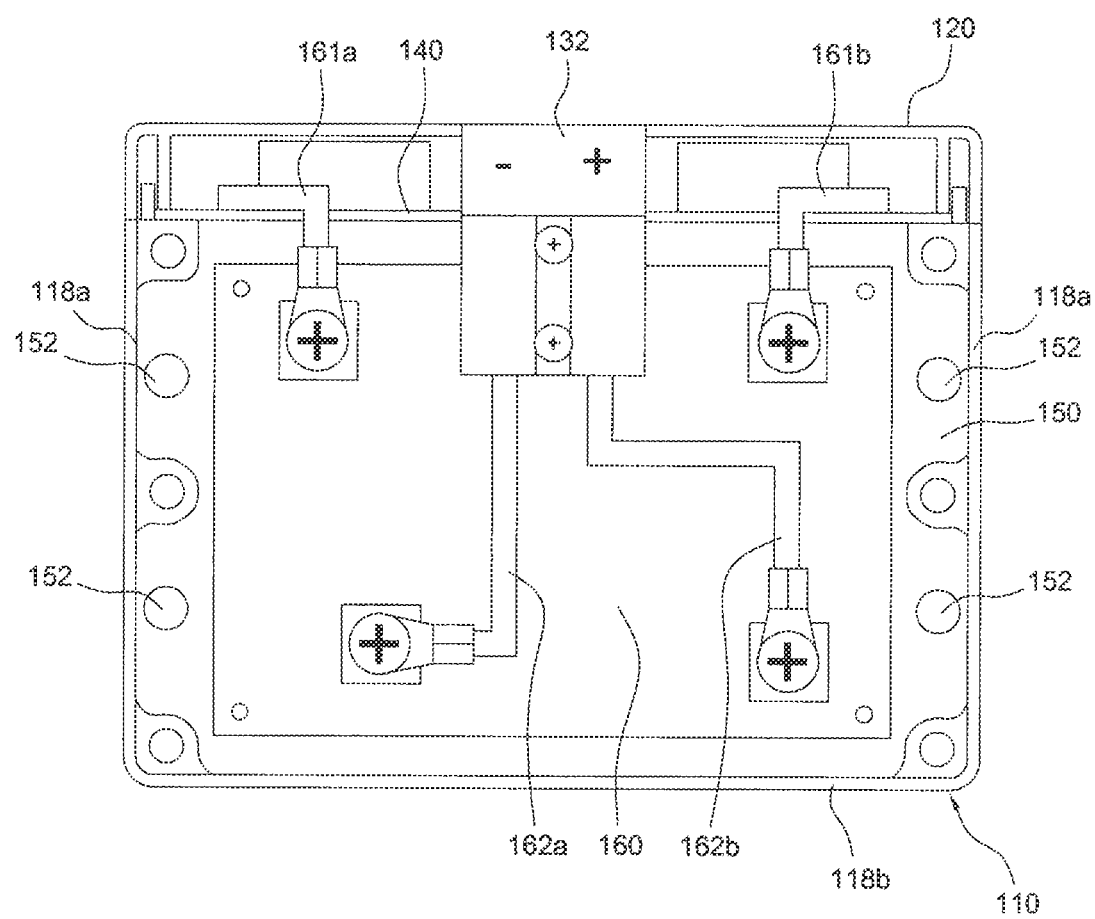

FIGS. 7A and 7B are a side view and a front view illustrating a state in which the front cover is removed from the battery pack shown in FIG. 1A.

As shown in FIG. 7A, the reinforcement portion 180 substantially surrounds sidewalls 112 and 113 of the housing 110. Here, opposite sidewalls of the housing 110 are defined as reference numeral 112, and a rear sidewall of the housing 110 is defined as reference numeral 113.

The opposite sidewall reinforcement portions 181 of the reinforcement portion 180 closely contact the opposite sidewalls 112 of the housing 110, and the rear sidewall reinforcement portion 182 of the reinforcement portion 180 closely contacts the rear sidewall of the housing 110.

In detail, the opposite sidewall reinforcement portions 181 of the reinforcement portion 180 closely contact the plurality of latticed ribs 112a formed on the opposite sidewalls 112 of the housing 110. In addition, the rear sidewall reinforcement portion 182 of the reinforcement portion 180 closely contacts the plurality of latticed ribs 113a formed on the rear sidewall of the housing 110.

In addition, the substantially elliptical ribs 112b formed on the opposite sidewalls 112 of the housing 110 are engaged with the holes 181a formed in the opposite sidewall reinforcement portions 181 of the reinforcement portion 180. Likewise, the substantially elliptical ribs 113b formed on the rear sidewall 113 of the housing 110 are engaged with the holes 182a formed on the rear sidewall reinforcement portion 182 of the reinforcement portion 180. Therefore, the elliptical ribs 112b and 113b formed on the sidewalls 112 and 113 of the housing 110 are engaged with the elliptical holes 181a and 182a formed on the reinforcement portion 180, thereby further increasing the coupling force between the housing 110 and the reinforcement portion 180.

Meanwhile, the reinforcement portion 180 has coupling portions 184 formed at the opposite sidewall reinforcement portions 181, the coupling portions 184 closely contacting the front vertical extending portions 117a of the housing 110 and engaged with the bolts 152 perforating the end plate 150 and the front vertical extending portions 117a.

Here, nuts 185 may be pre-welded to the coupling portions 184 of the reinforcement portion 180. The bolts 152 perforating the end plate 150 and the front vertical extending portions 117a are easily engaged with the nuts 185.

As shown in FIG. 7B, the end plate 150 includes the plurality of bolts 152 formed to perforate the same. As described above, the bolts 152 perforate the front vertical extending portions 117a of the housing 110 and the coupling portions 184 of the reinforcement portion 180 to then be engaged with the nuts 185. Therefore, the bolts 152 serve to couple the reinforcement portion 180 and the end plate 150 to the housing 110.

Figure 8A:
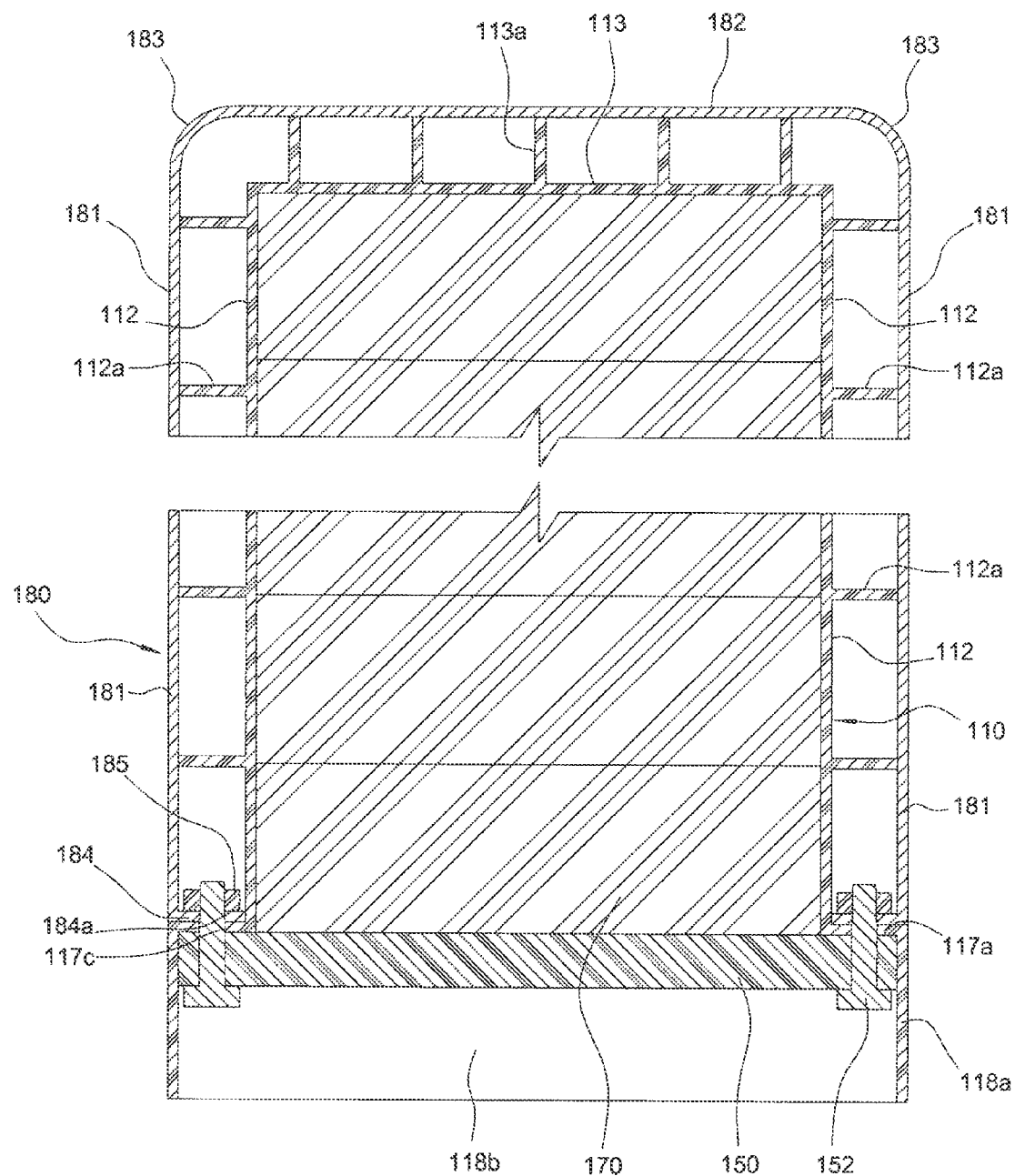
FIGS. 8A and 8B are sectional views illustrating a connection relationship between a housing and the reinforcement portion in the battery pack shown in FIG. 1A.
Figure 8B:
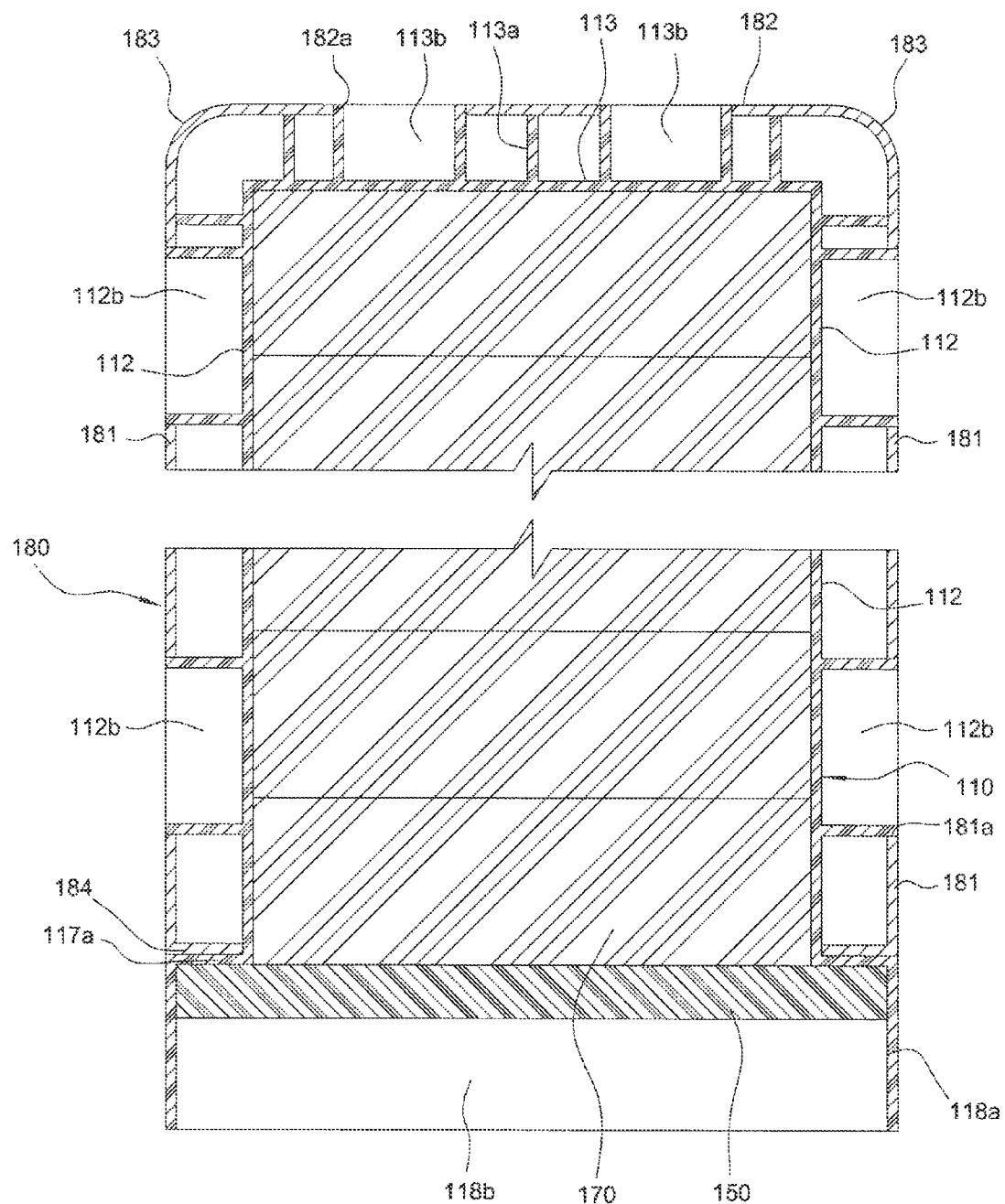

FIGS. 8A and 8B are sectional views illustrating a connection relationship between a housing and the reinforcement portion in the battery pack shown in FIG. 1A.

As shown in FIGS. 8A and 8B, the housing 110 includes the front vertical extending portions 117a and the front horizontal extending portion 118a for coupling the reinforcement portion 180 and accommodating the end plate 150 and a BMS board. In one embodiment, the front vertical extending portions 117a are vertically oriented with respect to the sidewalls 112 and extend outwardly from the housing 110. In addition, the front horizontal extending portion 118a is horizontally oriented with respect to the sidewalls 112 and extends from the front vertical extending portions 117a. Here, the front vertical extending portions 117a include the plurality of holes 117c for engagement with the bolts 152.

The end plate 150 closely contacts the front surface of the front vertical extending portions 117a, and the reinforcement portion 180 closely contacts the rear surface of the front vertical extending portions 117a. In other words, the coupling portions 184 of the reinforcement portion 180 closely contact the rear surface of the front vertical extending portions 117a outwardly extending from the sidewalls 112. Here, the coupling portion 184 is substantially vertically bent toward the interior side from the either sidewall reinforcement portion 181 of the reinforcement portion 180, and the sidewall reinforcement portion 181 closely contacts the outer surface of the latticed ribs 112a.

The bolts 152 each perforate the end plate 150, the front vertical extending portions 117a and the coupling portions 184 are then engaged with the nuts 185. Since the nuts 185 are pre-welded with the coupling portions 184 of the reinforcement portion 180, it is not necessary to install or use separate tools for rotating the nuts 185 between the reinforcement portion 180 and the housing 110. In fact, since a gap between the reinforcement portion 180 and the housing 110 is small, it is quite difficult to install or use separate tools for rotating the nuts 185.

In such a manner, the coupling portions 184 of the reinforcement portion 180 are fastened with the front vertical extending portions 117a of the housing 110 by means of the bolts 152 and the nuts 185. Therefore, the reinforcement portion 180 comes into tightly contact with the housing 110 while enveloping the opposite sidewalls 112 and the rear sidewall 113 of the housing 110.

The opposite sidewall reinforcement portions 181 of the reinforcement portion 180 closely contact the plurality of latticed ribs 112a formed on the opposite sidewalls 112 of the housing 110, and the substantially elliptical ribs 112b formed on the opposite sidewalls 112 of the housing 110 are engaged with the holes 181a formed in the opposite sidewall reinforcement portions 181 of the reinforcement portion 180.

In addition, the rear sidewall reinforcement portion 182 of the reinforcement portion 180 closely contacts the plurality of latticed ribs 113a formed on the rear sidewall of the housing 110, and the substantially elliptical ribs 113b formed on the rear sidewall 113 of the housing 110 are engaged with the holes 182a formed on the rear sidewall reinforcement portion 182 of the reinforcement portion 180.

In such a manner, the reinforcement portion 180 is generally configured to surround the sidewalls, that is, two opposite sidewalls 112 and a rear sidewall 113, of the housing 110.

Therefore, according to an embodiment of the present invention, a strength of the housing 110 can be enhanced by the reinforcement portion 180, the housing 110 can be prevented from significantly deforming against external impacts, and the battery cells 170 accommodated in the housing 110 can be safety protected.

Although the battery pack according to exemplary embodiments of the present invention have been described for illustrative purposes, those skilled in the art will appreciate that various modifications are possible without departing from the scope and spirit of the invention as disclosed in the appended claims.

DESCRIPTION OF THE SYMBOLS IN
MAIN PORTIONS OF THE DRAWINGS

100: Battery Pack
110: Housing
112, 113: Sidewall
114: Upper Extending Portion
117a, 117b: Front Vertical Extending Portions
118a, 118b: Front Horizontal Extending Portions
120: Upper Cover
130: Front Cover
133: Handle
140: Middle Cover
142: Bus Bar Seating Portion
142b: Internal Middle Protrusion
144: Coupling Portion
150: End Plate
160: BMS Board
163: Bolt
171: Terminal
172: Safety vent
174: Bus bar
181: Opposite Sidewall Reinforcement Portion
181a, 182a: Holes
182: Rear Sidewall Reinforcement Portion
183: Curved Portion
184: Coupling Portions 111: Bottom Portion
112a, 112b, 113a, 113b: Ribs
115: Upper Coupling Portion 122: Dual Lower Coupling Portion
132: Connector
134: Handle Groove
141: Body
142a: Upper Protrusion
143: Gas Release Guide
145: Auxiliary Coupling Portion
151: Hole
161, 162: Power Line
170: Battery Cell
171a: 171b: Nut
173: Plug
180: Reinforcement Portion

What is claimed is:

1. A battery pack comprising:
a battery module comprising at least one battery cell;
a housing accommodating the at least one battery cell, the housing comprising a bottom plate and a plurality of side walls extending from the bottom plate, wherein the side walls each have a plurality of ribs extending therefrom in a direction generally away from the at least one battery cell; and
a reinforcement member coupled to the housing and at least partially covering the plurality of ribs, wherein the reinforcement member is a single integral component and is at three sides of the housing; wherein the reinforcement member has a plurality of holes, and each of the plurality of ribs is engaged with a respective one of the plurality of holes, and wherein the reinforcement member is spaced apart from the side walls and seated on the plurality of ribs.

2. The battery pack of claim 1, wherein the reinforcing member has a coupling portion configured to receive a fastener to couple the reinforcing member to the housing.

3. The battery pack of claim 2, wherein a first side wall and a second side wall of the plurality of side walls extend in a direction substantially parallel to each other and wherein the housing has an attachment flange extending from the first and second side walls and configured to abut the coupling portion.

4. The battery pack of claim 3, wherein a fastener extends through an opening in the coupling portion and an opening in the attachment flange to couple the reinforcing member and the housing together.

5. The battery pack of claim 4, wherein the fastener is a bolt.

6. The battery pack of claim 1, wherein the housing comprises a resin comprising Acrylonitrile-Butadience-Stryene, Polyamide, PolyCarbonate, PolyChloroTriFluoroethylene, Poly DiAllyl Phthalate, Poly Ethylene, Poly Ethylene TerePhthalate, Phenol-Formaldehyde, Polyisobutylene, Poly Methyl MethAcrylate, Polyoxymethylene, Polyformaldehyde, PolyPropylene, PolyStyrene, PolyTetraFluoroEthylene, Polyurethane, Poly Vinyl Acetate, Poly Vinyl Alcohol, Poly Vinyl Butyral, Poly Vinyl Chloride, Poly Vinyl Chloride Acetate, Poly VinyliDene Chloride, Poly Vinyl Fluoride, or Poly Vinyl ForMal.

7. The battery pack of claim 1, wherein the reinforcing member comprises an engineering plastic resin or a fiber-reinforced plastic resin.

8. The battery pack of claim 1, wherein reinforcing member comprises Polyamide, Polyacetal, Polycarbonate, Modified Polyphenylen Oxide, or PolyButylene Terephthalate.

9. The battery pack of claim 1, wherein the reinforcing member comprises a metal.

10. The battery pack of claim 1, wherein reinforcing member comprises stainless steel, aluminum, aluminum alloy, copper, copper alloy, magnesium or magnesium alloy.

11. The battery pack of claim 1, further comprising an end plate coupled to the reinforcing member.

12. The battery pack of claim 1, further comprising an outer cover coupled to the housing, wherein the housing has a coupling portion and wherein the outer cover is coupled to the housing by the coupling portion.

13. The battery pack of claim 1, wherein the reinforcing member extends around the three sides of the battery module.

14. The battery pack of claim 1, wherein the housing further comprises a plurality of flanges adapted to engage openings of the reinforcing member to couple the reinforcing member to the housing.

15. The battery pack of claim 14, wherein the plurality of flanges are generally rectangular.

16. The battery pack of claim 1, wherein a plurality of ribs extend from the bottom plate in a direction away from the battery cells.

17. The battery pack of claim 1, wherein the reinforcing member comprises a pair of substantially parallel side members, a rear wall, and a pair of connection portions, one of the connection portions between the rear wall and a respective one the side members.

18. The battery pack of claim 17, wherein at least one of the pair of connection portions is curved.

\* \* \* \* \*